Patented Jan. 1, 1952

2,580,876

UNITED STATES PATENT OFFICE 2,580,876

COPOLYMER OF STYRENE AND ROSIN AND ESTERS THEREOF WITH THE ALCOHOLYSIS PRODUCT OF A DRYING OIL AND A POLYHYDRIC ALCOHOL CONTAINING FREE HYDROXYL GROUPS

James A. Arvin, Homewood, and Wayne B. Gitchel, Chicago, Ill., assignors to The Sherwin-Williams Company, Cleveland, Ohio, a corporation of Ohio No Drawing. Application March 30, 1945, Serial No. 585,804

19 Claims. (Cl. 260—23)

This invention relates to new and improved film forming compositions and more particularly to new and improved varnishes and enamels and to a method of producing them.

One of the objects of the invention is to produce new and improved film forming compositions from readily available raw materials.

Another object of the invention is to provide new and useful film forming materials which produce excellent clear, hard films of high gloss, toughness, hardness, adherence, good brushing characteristics, satisfactory drying characteristics and good recoatability.

A further object of the invention is to provide new and improved types of enamels from readily available raw materials. Other objects will appear hereinafter.

In accordance with this invention it has been found that new and useful interpolymers are obtained by polymerizing a styryl compound (e. g. styrene) with a resin acid of the type containing free carboxylic acid groups (e. g. rosin) in which the quantity of resin acid by weight is at least equal to that of styryl compound and preferably sufficiently greater to produce an interpolymer soluble in non-aromatic hydrocarbon solvents, as hereinafter more fully described.

The polymerization is effected by heating, preferably at temperatures below the decomposition temperatures of the reacting components and above about 300 degrees F. Good results have been obtained without the use of catalysts but catalysts may be used if desired.

In the practice of the invention using rosin and styrene it is preferable to heat the reacting ingredients to refluxing temperatures and to increase the temperature to maintain refluxing conditions during the polymerization. Styrene refluxes at about 320 degrees F. in the presence of rosin under atmospheric conditions. Rosin begins to decompose at temperatures above 550 degrees F. and hence it is desirable to maintain temperatures below this point while free rosin is present. The two methods of polymerization which have proved satisfactory in practice may be described as (1) the slow method in which the reaction mixture is held at a refluxing temperature around 320 degrees F. for a rather long period of time, say 12 hours, the temperatures then being raised to around 395–400 degrees F. for a shorter period, say 2 hours; and (2) the fast method in which the reaction mixture is heated from about 320 degrees F. to 450 degrees F. in not over 4 hours and as fast as the reflux rate will allow, the heating then being continued for a further period of time, say about 3 hours, for a total overall heating of 7 hours.

The interpolymers or polymerization products, as they are referred to herein, produce excellent varnishes when at least partially esterified and dissolved in a polyhydric alcohol alcoholyzed drying oil. The expression "polyhydric alcohol alcoholyzed drying oil" is used herein to describe an oil produced by heating a drying oil or a semi-drying oil with a polyhydric alcohol, such as glycerine, pentaerythritol, polypentaerythritol, sorbitol and mono- and polyethylene glycols, until the glyceride structure of the drying oil or semi-drying oil is partially hydroxylated. In other words, one or more of the long chain or fatty acid groups of the oil glyceride has been displaced from the glyceride molecule by reaction with the added polyhydric alcohol thereby leaving one or more free hydroxy groups in the oil glyceride nucleus free to react with the previously prepared interpolymer.

The reaction with the polyhydric alcohol alcoholyzed drying oil is conducted at elevated temperatures, preferably around 500–600 degrees F. depending upon the type of oil and the pressure conditions. Atmospheric pressures are ordinarily employed and no blowing is necessary. This reaction may be effected, however, under atmospheric, sub-atmospheric or super-atmospheric pressures with or without blowing. The heating is continued until the desired reaction has been effected and the desired body has been obtained which will usually require around 3 to 6 hours at temperatures of say 550 degrees F. Since polymerization and esterification reactions are occurring simultaneously, the use of higher temperatures may affect somewhat the properties of the products, the higher temperatures tending to speed polymerization more than esterification.

The invention will be illustrated, but is not limited by the following examples in which the quantities are stated in parts by weight, unless otherwise indicated:

Example I

Three parts (2700 gms.) of rosin and one part (900 gms.) of styrene were heated together at a temperature which maintained a steady reflux of monomeric styrene. As the polymerization proceeded, the temperature increased until, after 4½ hours, it reached 408 degrees F. At that point, very little monomeric styrene refluxed. The reaction mixture, if cooled at that time to room temperature, gave a clear, amber, brittle solid. After 2 hours more of heating, the temperature reached 450 degrees F. The resin then had a bar melting point of 153 degrees F. which remained constant during an additional hour of heating at 450 degrees F. The final product was a clear, amber, brittle solid having a 153 degrees F. bar melting point and an acid value of 119.5.

This resin was used in making a varnish with an alcoholyzed dehydrated castor oil. Sixteen hundred (1600) parts of dehydrated castor oil and 84 parts of glycerine were heated with good agitation to 350 degrees F. at which point 3.2 parts of litharge was added and the temperature raised to 440 degrees F. for 45 minutes. The styrene-rosin resin (1000 parts) was added and the temperature was held at 550 degrees F. until the acid value was reduced to 6.6, the cure was 31 sec. and viscosity was such as to give a U Gardner-Holdt viscosity when diluted to 60% solids with mineral spirits. At 60% solids with mineral spirits, the varnish was clear and, with 0.5% lead and 0.05% cobalt as naphthenate driers, dried rapidly to an excellent, clear film.

Example II

Two parts (2212 gms.) of rosin and one part (1106 gms.) of styrene were heated as in Example I. At the end of 4½ hours, the temperature reached 420 degrees F.; at 5 hours, 10 minutes, 428 degrees F.; and at 6 hours and 10 minutes, the temperature was 440 degrees F. The product was similar in appearance to that of Example I, but had a bar melting point of 155 degrees F. The mixture was held at 440 degrees F. and blown with steam for 30 minutes. About 3% of volatile material was thus removed. The final melting point was 157 degrees F. and the acid value 109.

A varnish was made from this resin by the procedure and proportions used in Example I except that 73 parts instead of 84 parts of glycerine were used. Heating at 550 degrees F. for 3¼ hours gave a product having an acid value of 11.3, a viscosity of S (Gardner-Holdt) at 60% solids in mineral spirits, and a "cure" of 27 sec. The solution in mineral spirits at 60% solids was slightly cloudy but could be made clear by the addition of 10% of aromatic solvent. A film of the material, with 0.5% lead and 0.05% cobalt as naphthenate driers, dried rapidly to an excellent film which was very faintly cloudy.

The fact that a film of the material prepared as in this example was very faintly cloudy indicates that the ratio of 2 parts of rosin to 1 part of styrene is approximately the critical minimum for the preparation of clear varnishes from predominantly non-aromatic solvents. These compositions, however, are still excellent for the preparation of enamels, that is to say varnishes to which pigments have been added.

Example III

A mixture of 2700 parts of rosin and 700 parts of styrene was heated to 320 degrees F. Another 200 parts of styrene containing 18 parts of benzoyl peroxide was added slowly from a dropping funnel during the course of 6 hours. The temperature was held at 320 degrees F. for another 6 hours. The mixture was soft and tacky at room temperature. Over a period of 2½ hours the temperature was raised gradually to 395 degrees F. At this point the reaction product, at room temperature, was a clear, amber, brittle resin. Its bar melting point was 155 degrees F., and this remained constant during an additional two hours of heating at 395 degrees F. The acid value was 114.

A mixture of 1451 parts of dehydrated castor oil and 76 parts of glycerine was heated with good agitation to 400 degrees F. before 3.1 parts of litharge was added. The temperature was raised to 445 degrees F. for 45 minutes, and then 1180 parts of the rosin-styrene resin was added. The temperature was gradually raised to 510 degrees F. over a period of 9 hours, and held there for 4 hours. The product has an acid value of 12.2 and a viscosity of F—G (Gardner-Holdt) at 60% solids in mineral spirits. The mineral spirits solution at 60% solids gave a clear solution, and a film of the material, with 0.5% lead and 0.05% cobalt as naphthenate driers, dried rapidly to an excellent, clear film.

Example IV

A mixture of 2400 parts of rosin and 924 parts of styrene was reacted as in Example III, adding 24 parts of benzoyl peroxide in 276 parts of styrene during the course of 6 hours and giving an additional heating of 5¾ hours at 320 degrees F. A sample of the material was soft and tacky at room temperature. After the temperature was raised to 400 degrees F. over a three hour period, the material was a clear, amber, brittle solid at room temperature and had a bar melting point of 140 degrees F. On holding at 400 degrees F. for 2 hours, the bar melting point increased to 155 degrees F. The melting point remained constant for an additional hour at 400 degrees F., at which time the acid value was 102.

A varnish was made from the polymer as follows: 1311 parts of dehydrated castor oil and 69 parts of glycerine were heated with good agitation to 400 degrees F.; 2.8 parts of litharge was added and the temperature held at 445 degrees F. for 45 minutes; 1250 parts of the styrene-rosin polymer was added and the temperature raised to 510 degrees F. for 9 hours. The acid value was 13.2. After the temperature was held at 520 degrees F. for 4 hours, the acid value was 12.3 and the viscosity I (Gardner-Holdt) at 60% solids in mineral spirits. The solution of the varnish at 60% in mineral spirits was cloudy. A solution of the varnish at 60% solids in a solvent of ⅔ mineral spirits and ⅓ aromatic solvent was clear. A film of the clear solution, with 0.5% lead and 0.05% cobalt as naphthenate driers, dried rapidly to an excellent, clear film.

Example V

A mixture of 1½ parts of rosin and 1 part of styrene was heated, the temperature being raised as rapidly as refluxing would permit to 516 degrees F. over a period of 10 hours. The bar melting point of the product at this point was 160 degrees F. and remained constant after an additional heating period of one hour at 529 degrees F. The product was blown with steam for 45 minutes and then blown with carbon dioxide for ½ hour. Upon cooling to room temperature a solid resin was obtained having a 170 degrees F. bar melting point and an acid number 103.

A varnish was made from this resin: 1600 parts of dehydrated castor oil and 69 parts of glycerine were heated with good agitation to 350 degrees F. and 3.2 parts of litharge was added. The temperature was held at 440 degrees F. for 45 minutes before 1000 parts of the styrene-rosin resin was added and the temperature raised to 550 degrees F. for 3½ hours. This product had an acid value of 11.3, a viscosity of S (Gardner-Holdt) at 60% solids in mineral spirits, and a 27 sec. "cure." The solution at 60% solids in mineral spirits was cloudy. A film of this material, with 0.5% lead and 0.05% cobalt as naphthenate driers, dried rapidly to a hard, tough film which was slightly cloudy.

Example VI

A mixture of 1000 parts of rosin, 1000 parts of styrene and 10 parts of benzoyl peroxide was heated to 300 degrees F. for 3 hours. The temperature was raised to 340 degrees F. during the course of 7 hours. A sample of the material was soft and tacky at room temperature. After the temperature was raised to 400 degrees F. over a period of 2 hours, a sample of the product was hard at room temperature. In 3 hours at 400 degrees F. the melting point reached 177 degrees F. and remained constant for an additional heating of 1 hour at 400 degrees F. The material was a pale yellow, brittle solid with an acid value of 77.5.

A varnish was made from the resin as follows: 585 parts of dehydrated castor oil and 31 parts of glycerine were heated with good agitation to 400 degrees F. before 1.2 parts of litharge was added; the temperature was raised to 450 degrees F. for 45 minutes; 721 parts of the styrene-rosin interpolymer was added and the temperature raised to 500 degrees F. for 10 hours. The acid value was 9.3. After the temperature was held at 525 degrees F. for 4 hours, the acid number was reduced to 5.1. The product was cloudy.

Example VII

A mixture of nine parts of rosin and one part of styrene was heated for 45 minutes at 325 degrees F., 4½ hours at 325–420 degrees F., 1½ hours at 440 degrees F., the melting point remaining constant at 150 degrees F. for the last hour of heating. At room temperature the product was a clear, amber, brittle resin having an acid value of 141.

A varnish was made from the resin as follows: 830 parts of dehydrated castor oil and 42½ parts of glycerine was heated with good agitation to 400 degrees F. before 0.9 part of litharge was added; the temperature was raised to 440 degrees F. and held for 1 hour; 500 parts of the rosin-styrene interpolymer was added; the temperature raised to 460 degrees F. for ½ hour and to 550 degrees F. for 6 hours. The product had an acid value of 9.3, a viscosity of V (Gardner-Holdt) at 60% solids in mineral spirits, and a 27 sec. "cure." Films of this material, with 0.5% lead and 0.05% cobalt as naphthenate driers, were compared with a standard made of rosin and alcoholyzed dehydrated castor oil. The rosin-styrene-dehydrated castor oil product showed little improvement in drying properties over the rosin-dehydrated castor oil varnish, but it did show a decided improvement in alkali and water resistance.

Example VIII

The varnish made in Example IV was pigmented as follows: 250 parts of the varnish and 400 parts of titanium oxide ("Titanium," C. P.) were mixed and ground on a roller mill. Sufficient varnish was added to the resultant paste to give a ratio of 1.13 parts resin : 1 part pigment. Naphthenate driers were added to give an equivalent of 0.5% lead and 0.05% cobalt based on the oil content. The enamel had excellent brushing properties and dried rapidly to a hard, tough, adherent film of high gloss. The material was readily recoatable after an overnight dry.

Example IX

The varnish made in Example III was pigmented according to the procedure followed in Example VIII. This enamel gave a hard, tough, adherent film of slightly higher gloss than obtained in Example VIII.

In the foregoing examples the interpolymers were made in 5-liter glass flasks equipped with thermometer, agitator, reflux condenser and water trap. The water trap was necessary to remove a small amount of water present in the rosin.

The term "cure" as used herein refers to the number of seconds required to gel or solidify a thin film of the resin-styrene interpolymer, when spread on a hot plate set at a designated temperature. In the examples all "cures" were performed on a hot plate set at 390 degrees F.

The "bar melting point" is the melting point determined by spreading the powdered resinous material on a bar having graduated temperatures along its length and ascertaining the temperature, by a thermocouple device, at that section of the bar where the powder melts.

The styrene used in the foregoing Examples was a commercial monomeric styrene containing a small amount of an inhibitor or stabilizer (N99 grade of styrene, containing 99% styrene, the remainder being a stabilizing agent and impurities). The rosin used was a gum rosin (WW grade according to the rosin color scale) and the dehydrated castor oil employed was a 45 poise dehydrated castor oil.

The "mineral spirits" used in the examples had a boiling range of 150–200 degrees C. and less than 10% of aromatic hydrocarbons. This type of solvent is well known in the art and since it is substantially non-aromatic in character, is a preferred type of solvent for varnish bases. The "aromatic solvent" mentioned in the examples was an aromatic hydrocarbon solvent having a boiling range of 135–185 degrees C. and containing above 90% of aromatic hydrocarbons, such as xylene and the like. The use of this type of solvent is in general undesirable in varnish practice because of the volatility, the penetrating odor and the toxicity of the vapors.

It will be observed from the examples that the weight ratio of rosin to styrene has been varied as follows:

| Example | Weight Ratio |
| --- | --- |
| I | 3:1 |
| II | 2:1 |
| III | 3:1 |
| IV | 2:1 |
| V | 1½:1 |
| VI | 1:1 |
| VII | 9:1 |

The compositions of Examples I and III were satisfactory in ever respect and gave clear films with substantially non-aromatic solvents (i. e. solvents containing less than 10% aromatics). The compositions of Examples II and IV gave clear films with solvents which were predominantly non-aromatic but contained in excess of 10% of aromatic solvents. The compositions of Examples V and VI gave cloudy films with non-aromatic solvents. These compositions could be used for varnishes with predominantly aromatic solvents, but this type of varnish is less desirable for the purpose of the invention for reasons already explained. All of the compositions described in Examples I to VI could be used in making enamels and the resultant enamels have satisfactory recoating characteristics. However, the compositions containing at least two parts of rosin per part of styrene are preferred for the production of enamels. In general, for the preparation of clear varnishes, the ratio of rosin to styrene (or their equivalents) should be at least 2:1 by weight and preferably 3:1 by weight. The upper limit is preferably a weight ratio of rosin to styrene (or their equivalents) of 9:1. For the production of enamels the weight ratio of rosin to styrene (or their equivalents) may be as low as 1:1, the upper limit being the same. Thus, it is possible to use a higher proportion of styrene where the final product is to be used as an enamel. There is an upper limit, however, since the use of a cloudy solution ordinarily has a deleterious effect on the gloss and even with these solutions or suspensions, a point is reached where the suspended particles interfere with the gloss. The upper limit is also determined, to some extent, by the point at which a film of the coating composition is no recoatable within a reasonable period of time, say 24 hours.

The resin acid employed should preferably be a gum rosin, such as WW gum rosin, which has no crystallizing tendency. Wood rosin can be employed, although it is somewhat yellower and other oil soluble acidic resins containing free carboxylic acid groups can be used, but the best results have been obtained with rosin or materials containing rosin. As examples of other types of resin acids can be mentioned polymerized rosin, tallol (a by-product of the paper industry containing about 41–50% rosin, 50% non-conjugated fatty acids and up to 9% unsaponifiables) and natural resins, such as cracked copals which are cracked to an acid number of say 30 to 50 and are oil soluble. Rosin usually has an acid number of 150 or higher and, in general, the resins used may have an acid number of 50 or higher.

Although pure styrene may be used, the commercial styrenes containing substances to stabilize them against polymerization at ordinary temperatures have been found to be satisfactory. Thus, styrene containing less than 1% of a stabilizer which became ineffective around 300 degrees F. gave good results. The styrene may also be replaced in part with alpha methyl styrene, para chloro styrene, alpha chloro styrene, meta chloro styrene, para methyl styrene, meta methyl styrene, ortho methyl styrene and/or dichloro or dimethyl styrene derivatives. In general, these compounds are characterized by a carbocyclic nucleus to which is attached an acyclic unsaturated hydrocarbon chain, more specifically, a vinyl group. Dipentene and/or pinene may also be used in part.

Various types of oils may be employed in the practice of the invention, including both drying oils and semi-drying oils. Both types are referred to herein as drying oils. As examples of oils which are suitable for the practice of the invention, the following may be mentioned:

Soybean oil, non-conjugated, semi-drying oil
Linseed oil, non-conjugated, drying oil
"Thermoil A," non-conjugated, drying oil
"Dehydrol," about 20–25% conjugated, drying oil
China-wood oil, about 80% conjugated, drying oil
Oiticica oil, about 80% conjugated, drying oil "Dehydrol" is a dehydrated castor oil. It has given excellent results and good results have also been obtained with linseed oil and a combination of "Dehydrol" and "Thermoil A." "Thermoil A" is an extracted and refrigerated fish oil resembling linseed oil in properties. The oils which have a high percentage of conjugation undergo very rapid polymerization during the heating period required for esterification and hence these oils, such as China-wood oil, have a tendency to gel when the rosin-styrene polymers are being esterified at say 550 degrees F. It is preferable, therefore, to employ these oils in conjunction with less highly conjugated oils, such as dehydrated castor oil. The rapid polymerization can be controlled, however, to some extent, by speeding up the esterification rate, employing larger quantities of polyhydric alcohol and using lower temperatures. In carrying out the invention the "cure" should be followed closely to prevent gelation and, when the proper "cure" is reached, the heating stopped regardless of the acid number. The acid number at this point will ordinarily be below 25. A low acid number in the finished product is desirable because a high acid number tends to produce poor water resistance.

The nature of the reactions involved is not definitely known but it is believed that the styryl compound and the resin acid combine to produce a polymer containing free carboxylic acid groups.

In the alcoholysis reaction the polyhydric alcohol reacts with the oil glyceride, for example, according to the following equation in which glycerine is used as a typical polyhydric alcohol:

*Equation I*

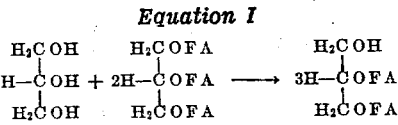

wherein FA is the residue of a fatty acid. Equation I is only a representative reaction of alcoholyzing an oil. The actual product is very likely a mixture of mono-, di-, tri-glycerides giving an average number of free hydroxy groups dependent on the proportion of alcohol used. The interpolymer of rosin and styrene then reacts with the product of Equation I so that the carboxylic acid radicals of the interpolymer esterify the free hydroxy groups of the product of Equation I. At the same time some further interpolymerization probably occurs. It will be understood that the alcoholysis reaction may be carried further than illustrated in Equation I by employing larger proportions of the alcohol and likewise that other types of polyhydric alcohols, as, for example, those previously mentioned, may be employed.

The amount of alcohol required to provide the necessary free hydroxy groups in the oil molecule where esterification of the carboxy groups of the resin acid interpolymer can be calculated by determining the acid number of the resin interpolymer and then calculating the theoretical quantity of the polyhydric alcohol required to provide the necessary free hydroxy groups. Generally, it is desirable to use a slight excess of the theoretical quantity of polyhydric alcohol, say about 10% by weight. The acid number is determined in a conventional manner by ascertaining the number of grams of potassium hydroxide required to neutralize 1000 grams of the interpolymer. For example, the molecular weight of glycerine is 92 and the equivalent weight for each hydroxyl group is, therefore, approximately 31 because it contains 3 hydroxy groups. The equivalent weight for each hydroxyl group is, therefore, approximately 31 because it contains 3 hydroxy groups. The equivalent weight of potassium hydroxide is 56. Hence the following equation would give the theoretical amount of glycerine required:

*Equation II*

$31/56 \times$ acid number of interpolymer → theoretical amount of glycerine

Ordinarily, the esterification reaction does not completely esterify the free acid groups present in the interpolymer and the final acid number of the product is preferably within the range of 5 to 15.

Varnishes and enamels produced in accordance with the invention have a high solids content which is largely governed by the amount of solvent added and is preferably within the range of 50–60%.

In the preparation of the enamels any well known type of pigment may be employed, including titanium dioxide, chrome yellow, chrome green, red iron oxide, ferrite yellow, toluidine red, Prussian blue, lampblack and Montstral blue.

The preferred types of composition prepared in accordance with the invention form clear films having good gloss, low odor, good color, will dry overnight so that they are tack-free to foil, have excellent recoating characteristics and can be cut or thinned with substantially non-aromatic hydrocarbon solvents. The films formed from these compositions as, for example, those made in accordance with Examples I and III, have stood 6 hours in 5% caustic soda solution and exhibited remarkable toughness in view of the low concentration of oil as compared to ordinary oleoresinous varnishes. For example, the present invention permits the use of only 14 gallons of oil to 100 pounds of resin to give the toughness and excellent film characteristics which would ordinarily require about 25 gallons of oil to 100 pounds of other resins. It will be understood, however, that the length of the varnish, as prepared herein, may vary within relatively wide limits, preferably from about 12 to about 40 gallons of oil per 100 pounds of polymer.

The rosin-styrene interpolymers provided in accordance with this invention are believed to be new compositions of matter and are characterized generally by an acid value within the range from about 75 to 140 and a ratio of rosin to styrene within the range of 1:1 to 9:1. The preferred interpolymers are those which are soluble in substantially non-aromatic hydrocarbon solvents and these will ordinarily contain at least 3 parts by weight of the resin acid per part of styryl compound.

The addition of the polyhydric alcohol serves the dual function of producing a product which chemically interacts by esterification with the interpolymer, at the same time reducing the acidity of the latter. This chemical action, furthermore, does not interfere with the polymerization that occurs on air drying and which is essential to the production of a hard, non-tacky film which can be recoated after drying.

The polymerization of styrene with oils is well known but compositions produced in this manner normally have poor gloss, poor recoating characteristics due to the fact that the first film has not been sufficiently converted to an insoluble stage to resist softening by the solvent of the second coat, and have a tendency to gel in the can due to their instability. Furthermore, they require a high percentage of aromatic solvents, which are objectionable and obnoxious.

Rosin alone added to oil produce compositions having poor drying characteristics, pronounced livering characteristics, poor water resistance and poor alkali resistance. Although ester gum can be added to the highly conjugated oils, such as China-wood oil, with good results, the addition of ester gum to the less highly conjugated types of oils produces compositions having poor water resistance, poor alkali resistance and poor drying characteristics. Heretofore in attempting to combine styrene with rosin for the manufacture of varnishes relatively large percentages of styrene have been used with the result that the products possessed poor oil solubility, lacked clarity and, in general, possessed the disadvantages of styrene alone. Since neither rosin nor styrene alone in the proportions previously used have given good results in varnish preparation, it could not be foreseen that the combination of these substances in certain proportions, coupled with the use of a polyhydric alcohol alcoholyzed drying oil, would produce novel and unexpected results.

Reference is made to our co-pending application U. S. Serial No. 613,702 filed August 30, 1945, now U. S. Patent Number 2,457,769, claiming resinous esters of polyhydric alcohols and copolymers of styrene and an oil soluble natural resin having an acid number of at least 30, the weight ratio of said resin to styrene being within the range from 2:1 to 9:1 and the copolymer being formed at a temperature within the range of 300 degrees F. to 550 degrees F.

Having thus described the invention, what we claim as new and desire to secure by Letters Patent of the United States is:

1. The product of the reaction of a copolymer of styrene and rosin copolymerized at a temperature within the range of 300° F. to 550° F. in a weight ratio of rosin to styrene within the range of 1:1 to 9:1, at least partially esterified with the alcoholysis product of a drying oil and a polyhydric alcohol containing free hydroxyl groups.

2. A copolymer of styrene and rosin copolymerized at a temperature within the range of 300° F. to 550° F. in a weight ratio of rosin to styrene of approximately 3:1, at least partially esterified with the alcoholysis product of a drying oil and a polyhydric alcohol containing free hydroxyl groups.

3. A coating composition comprising styrene copolymerized with rosin at a temperature within the range of 300° F. to 550° F. in a weight ratio of rosin to styrene within the range of 1:1 to 9:1, the proportion of the rosin being sufficient to produce a copolymer soluble in a non-aromatic hydrocarbon solvent, said interpolymer being at least partially neutralized with the alcoholysis product of a drying oil and a polyhydric alcohol containing free hydroxyl groups.

4. A coating composition comprising a copolymer of rosin and styrene copolymerized at a temperature within the range of 300° F. to 550° F. in proportions approximating 3 parts by weight of rosin to 1 part by weight of styrene, said copolymer being at least partially esterified with the alcoholysis product of a drying oil and a polyhydric alcohol containing free hydroxyl groups, and a predominantly non-aromatic hydrocarbon solvent containing less than 10% of an aromatic solvent.

5. A clear varnish composition capable of being applied to form clear films which exhibit good gloss, low odor, good color, satisfactory drying characteristics, good recoating characteristics, substantial resistance to water and alkalis, said composition being the product of polymerization of rosin with styrene at a temperature within the range of 300° F. to 550° F. in a weight ratio within the range from about 2:1 to 9:1, at least partially esterified with the alcoholysis product of a drying oil and a polyhydric alcohol containing free hydroxyl groups obtained by heating glycerine with a drying oil which is predominantly non-conjugated under conditions effective to replace a portion of the fatty acid molecules in the oil glyceride nucleus with a hydroxy group, dissolved in a predominantly non-aromatic solvent containing less than 10% of an aromatic solvent in proportions such that the solids content forms a major proportion by weight of said composition.

6. A composition as claimed in claim 5 in which the drying oil is dehydrated castor oil.

7. An enamel comprising the interpolymerization product of styrene and rosin copolymerized at temperatures within the range of 300° F. to 550° F. in proportions of rosin to styrene within the range of from 1:1 to 9:1, at least partially esterified and polymerized at temperatures within the range of 500° F. to 600° F. with the alcoholysis product of a drying oil and a polyhydric alcohol containing free hydroxyl groups, dissolved in a predominantly non-aromatic hydrocarbon solvent containing less than 10% of an aromatic solvent.

8. A copolymer of styrene and rosin copolymerized at a temperature within the range of 300° F. to 550° F. in a weight ratio of rosin to styrene within the range from 1:1 to 9:1.

9. The product of the polymerization at temperatures within the range of 300° F. to 550° F. of styrene and rosin, which has an acid number within the range of 90 to 140, a ratio of the rosin to the styrene within the range from 3:1 to 9:1 and which is soluble in mineral spirits containing less than 10% aromatic solvents.

10. A process of producing new and improved coating compositions which comprises polymerizing rosin and styrene at temperatures within the range of 300° F. to 500° F. in a weight ratio of the rosin to the styrene within the range from 1:1 to 9:1, and at least partially esterifying the resultant polymerization product with the alcoholysis product of a drying oil and a polyhydric alcohol containing free hydroxyl groups.

11. A method as claimed in claim 10 in which rosin and styrene are employed in a weight ratio of approximately 3:1.

12. A method as claimed in claim 10 in which the alcoholysis product of a drying oil and a polyhydric alcohol containing free hydroxyl groups is obtained by heating glycerine with a dehydrated castor oil in proportions sufficient to replace at least one fatty acid group in the oil glyceride molecule with a hydroxyl group.

13. A method of producing new and improved coating compositions which consists essentially in polymerizing styrene and an oil-soluble natural resin having an acid number of at least 30 at a temperature within the range of 300° F. to 550° F. in a weight ratio of said resin to styrene within the range of 1:1 to 9:1.

14. A method of producing new and improved coating compositions which comprises polymerizing styrene and an oil-soluble natural resin having an acid number of at least 30 at a temperature within the range of 300° F. to 550° F. in a weight ratio of said resin to styrene within the range of 1:1 to 9:1 and at least partially esterifying the resultant copolymer with the alcoholysis product of a drying oil and a polyhydric alcohol containing free hydroxyl groups.

15. A copolymer of styrene and an oil-soluble natural resin having an acid number of at least 30, copolymerized at a temperature within the range of 300° F. to 550° F. in a weight ratio of said resin to styrene within the range of 1:1 to 9:1.

16. A copolymer of styrene and an oil-soluble natural resin having an acid number of at least 30, copolymerized at a temperature within the range of 300° F. to 550° F. in a weight ratio of said resin to styrene within the range of 1:1 to 9:1, at least partially esterified with the alcoholysis product of a drying oil and a polyhydric alcohol containing free hydroxyl groups.

17. A copolymer of styrene and an oil-soluble natural resin having an acid number of at least 50, copolymerized at a temperature within the range of 300° F. to 550° F. in a weight ratio of said resin to styrene within the range of 2:1 to 9:1, at least partially esterified at a temperature within the range of 500° F. to 600° F. with the alcoholysis product containing free hydroxyl groups of a polyhydric alcohol and a drying oil which is predominantly nonconjugated.

18. A coating composition comprising a copolymer of styrene and an oil-soluble natural resin having an acid number of at least 30, copolymerized at a temperature within the range of 300° F. to 550° F. in a weight ratio of said resin to styrene within the range of 1:1 to 9:1, at least partially esterified with the alcoholysis product containing free hydroxyl groups of a drying oil and a polyhydric alcohol.

19. A coating composition comprising a copolymer of styrene and an oil-soluble natural resin having an acid number of at least 30, copolymerized at a temperature within the range of 300° F. to 550° F. in a weight ratio of said resin to styrene within the range of 1:1 to 9:1, at least partially esterified with the alcoholysis product containing free hydroxyl groups of a drying oil and a polyhydric alcohol, dispersed in a predominantly nonhydrocarbon solvent, said composition being capable of forming clear films which have good drying properties, good gloss, good color, good hardness, satisfactory recoatability and substantial resistance to water and alkalis.

JAMES A. ARVIN.
WAYNE B. GITCHEL.

REFERENCES CITED

The following references are of record in the file of this patent:

UNITED STATES PATENTS

| Number | Name | Date |
|---|---|---|
| 1,942,531 | Barrett | Jan. 9, 1934 |
| 1,975,959 | Lawson et al. | Oct. 9, 1934 |